Figure 1:
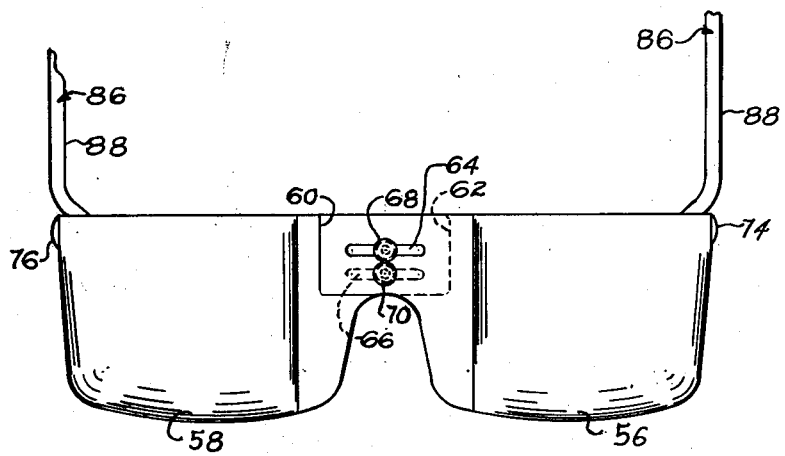

Nov. 4, 1952        F. S. CREIGHTON        2,616,082
COMBINATION EYESHADE AND SUNGLASSES
Filed June 24, 1949                                      3 Sheets-Sheet 1

INVENTOR.
FRANCIS S CREIGHTON
BY
Harold K. Martin
his attorney

Nov. 4, 1952   F. S. CREIGHTON   2,616,082
COMBINATION EYESHADE AND SUNGLASSES
Filed June 24, 1949   3 Sheets-Sheet 2

INVENTOR.
FRANCIS S. CREIGHTON
BY
Harold K. Martin
his Attorney

Nov. 4, 1952 F. S. CREIGHTON 2,616,082
COMBINATION EYESHADE AND SUNGLASSES
Filed June 24, 1949 3 Sheets-Sheet 3

INVENTOR.
FRANCIS S CREIGHTON
BY
Harold K. Martin
His Attorney

Patented Nov. 4, 1952

2,616,082

UNITED STATES PATENT OFFICE 2,616,082

COMBINATION EYESHADE AND SUNGLASSES

Francis S. Creighton, Elmira, N. Y.

Application June 24, 1949, Serial No. 101,111

1 Claim. (Cl. 2—12)

This invention relates to a combination of eye shade and sun glasses and has for its primary object to afford protection to the eyes of the user.

Another object is to preserve the visibility of the lenses of glasses in inclement weather by protecting them from the deposit thereon of water in the form of rain or snow.

Still another object is to facilitate the supporting of the combination eye shade and sun glasses in proper position with relation to the face of the user, either independently or in combination with glasses worn by the user.

A still further object is to afford to the wearer full vision while at the same time preserving protection of the eyes from above and from the sides.

The above and other objects may be attained by employing this invention which embodies among its features an elongated frame supported horizontally adjacent the brow of the user and above his eyes, a shade member pivotally connected to the frame for movement in a vertical arc from a position above the eyes of the user to a position in front of the eyes of the user and means carried by the frame adjacent opposite ends thereof detachably to couple bow members thereto.

Other features include yielding corrugated tongues carried by the frame adjacent each end thereof for engaging each adjacent bow member and holding said bow member in various vertical positions with relation to the frame.

Still other features include a nose piece detachably connected to the frame for longitudinal adjustment thereon, and a nose receiving recess in the edge of the shade member remote from the frame for accommodating the nose of the user when the shade member is lowered.

Additional features include a frame comprising elongated channel members and adjustably coupled together for longitudinal movement, a shade comprising longitudinally adjustable mating sections carried by the frame member, and means on the channel members for guiding the upper edges of the lenses of glasses worn by the user into the channel members of the frame.

In the drawings—

Figure 2:
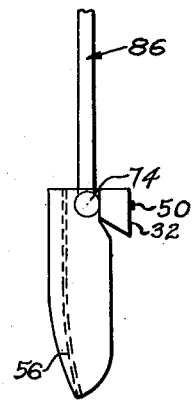
Figure 3:
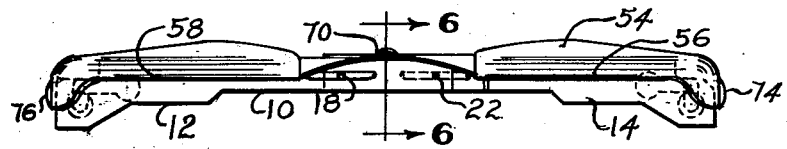
Figure 4:
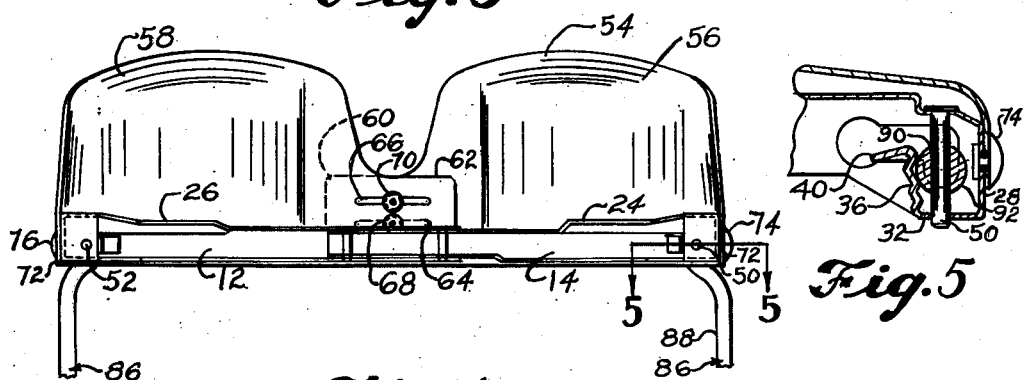
Figure 5:
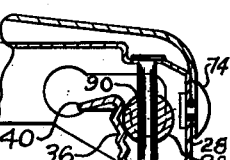
Figure 6:
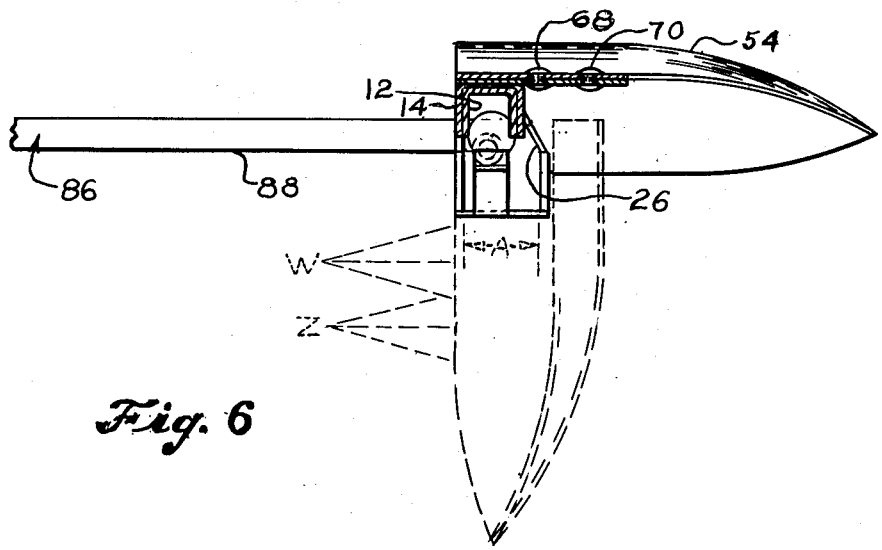
Figure 7:
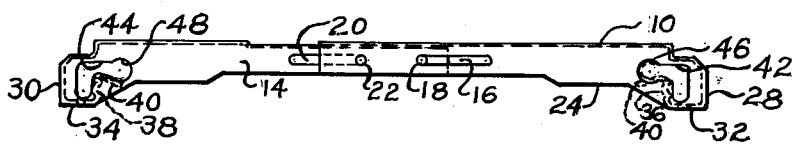
Figures 8, 9:
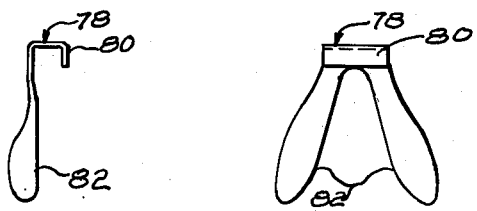
Figure 12:
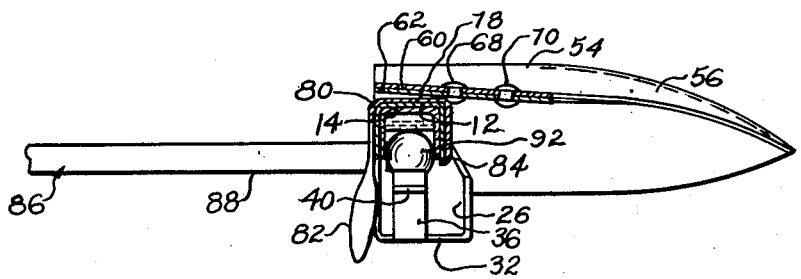
Figure 11:
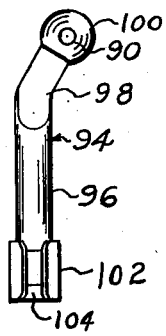
Figure 13:
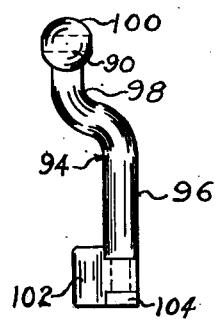
Figure 14:
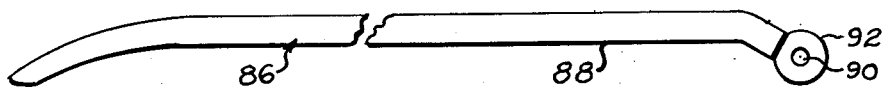
Figure 10:

Figure 1 is a top plan view of a combination eye shade and sun glasses embodying the features of this invention, Figure 2 is a side view in elevation of the combination eye shade and sun glasses illustrated in Figure 1, Figure 3 is a front view of the eye shade and sun glasses illustrated in Figure 1, Figure 4 is a bottom plan view of the eye shade and sun glasses illustrated in Figure 1, Figure 5 is a fragmentary enlarged section view taken substantially along the line 5—5 of Figure 4, Figure 6 is an enlarged transverse sectional view taken substantially along the line 6—6 of Figure 3, Figure 7 is a rear view of the frame member showing the shade member and the bow members removed, Figure 8 is an edge view of an adjustable nose piece, Figure 9 is a front view of the adjustable nose piece illustrated in Figure 8, Figure 10 is a rear view of the eye shade and sun glasses of this invention illustrating a modified form of bow member coupled thereto, Figure 11 is a top plan view of one of the short bow members used with spectacles, Figure 12 is an enlarged transverse sectional view through the structure illustrated in Figure 10, Figure 13 is a side view of the bow member illustrated in Figure 11, and Figure 14 is a top plan view of one of the bow members employed when the device is used without spectacles.

Referring to the drawings in detail a frame designated generally 10 comprises a pair of channel members 12 and 14 arranged in longitudinal alignment with the member 14 telescopically entering the member 12. Opposed flanges of the member 12 are provided with longitudinally extended co-extensive slots 16 for the reception of a cross pin 18 carried by the channel member 14 and the opposite side flanges of channel member 14 are provided with longitudinally extended elongated slots 20 for the reception of a cross pin 22 carried by the channel member 12. This pin and slot arrangement permits the channel members 12 and 14 to be moved longitudinally relative to each other so that the frame 10 is extensible. Carried by the channel members 12 and 14 adjacent their ends remote from the pin and slot connections are inclined guide flanges 24 and 26 respectively which serve when the device is used in connection with glasses worn by the user to guide upper edges of the lenses of such glasses into the channel members. The ends of the channel members 12 and 14 remote from the pin and slot connections are closed by end walls 28 and 30 respectively which are bent back upon themselves to form bottom walls 32 and 34 respectively. Formed at the inner ends of bottom walls 32 and 34 are upwardly extending horizontally corrugated tongues 36 and 38 respectively, each of which carries at its upper end an inwardly extended lip 40 which serves as a thumb piece by which its respective tongue may be sprung outwardly. Formed in the back flanges of the channel members 12 and 14 adjacent the end walls 28 and 30 are substantially inverted L-shaped slots 42 and 44 respectively, the horizontal legs of which terminate in enlarged openings 46 and 48 respectively for the reception of spherical ends of the bow or temple members to be more fully hereinafter described. Extending through the web portions of the channel members 12 and 14 adjacent the end walls 28 and 30 respectively, and through the bottom walls 32 and 34 are aligned openings 27 and 29, and 31 and 33 for the reception of pins 50 and 52, the purpose of which will be more fully hereinafter described.

A shade member designated generally 54 comprises two mating sections 56 and 58 respectively which are provided at their adjacent edges with overlapping tongues 60 and 62 respectively. These tongues are provided with longitudinally extending slots 64 and 66 respectively for the reception of guide pins 68 and 70 carried respectively by the tongues 60 and 62. This structure permits the shade member 54 to be adjusted longitudinally in accordance with the longitudinal adjustment of the frame 10 and also forms in the edge of the shade member remote from that carrying the tongues 60 and 62, a recess to accommodate the nose of the wearer when the shade member is tilted into a substantially vertical position before the eyes of the wearer. Each section 56 and 58 is provided at its end remote from the tongues 60 and 62 with an angularly extending ear 72, and these ears are pivotally connected as at 74 and 76 to opposite ends of the frame 10, as will be readily understood upon reference to the drawings, so that the shade member 54 will swing as a unit through vertical arc from a substantially horizontal position above the eyes of the wearer to a substantially vertical position in front of the eyes of the wearer.

In order to support the device in operative position when no glasses are worn by the wearer, I provide a nose piece designated generally 78 which comprises a substantially inverted U-shaped clip 80, one flange of which carries a pair of downwardly extending divergent nose engaging pad members 82, while the opposite flange is provided with an inturned tongue 84. The clip 80 is of a size readily to fit over the channel shaped frame 10 beneath the tongue with the inturned tongue thereof engaging the lower edge of the channel member 12 so as to support the nose piece 78 on the frame 10. With this type of structure, temples or bows designated generally 86 are employed, each of which comprises a shank member 88 which is provided at one end with any conventional ear engaging member, such as a hook (not shown). The end of each shank 88 remote from the ear engaging member is provided with a spherical enlargement 90 of a size to enter either of the enlarged openings 46 and 48 previously referred to, while the shanks 88 are of a diameter readily to enter the L-shaped slots 42 and 44. Each spherical head 90 is provided with a vertically extending opening 92 for the reception of one of the pins 50 or 52, according to the side of the frame 10 to which the temple or bow member 86 is to be attached.

When the device is to be used in connection with nose glasses worn by the wearer, the nose piece 78 is removed and the upper edges of the lenses of the nose glasses are guides into the channel members 12 and 14 by the inclined guide flanges 24 and 26 with the conventional ear engaging temples employed.

When it is desired to use the device in connection with spectacles, the nose piece 78 is likewise removed and the upper edges of the lenses of the spectacles are guided into the channel members 12 and 14 of the frame 10 by the inclined guide flanges 24 and 26. In this type of structure, however, in place of the bows or temples 86, previously referred to, I substitute arms designated generally 94, each of which comprises a shank member 96 provided at one end with an upwardly inclined portion 98 which terminates in a spherical head 100, which corresponds in all respects to the spherical head 90 of the bow members 86. As illustrated in Figures 10 through 12 inclusive, the shanks 96 have swively mounted at their ends remote from the spherical heads 100 with temple or bow receiving clips 102 for the reception of the temples or bows of the spectacles with which the device is worn.

With the arms 94 in proper position in the frame 10 and the frame seated on the upper edges of the lenses of a pair of spectacles worn by the wearer, the arms 94 will, owing to the upwardly inclined portions, lie beneath the bows of the spectacles so that upon moving upwardly the rear ends of the arms 94, the bows or temples of the spectacles will be engaged in the clips 102 thus securing the eye shade and sun glass combination in place on the spectacles.

In use with the combination shade and sun glasses supported either by the nose piece 78 or by the glasses worn by the user in a substantially horizontal position above the eyes of the wearer, it is obvious that upon moving the shade member through its vertical arc of movement, it may be elevated into a substantially horizontal position to form an effective eye shade, or when so desired, it may be moved into a substantially vertical position so that the sections 56 and 58 forming the shade member 54 will lie in front of the eyes of the user to form sun glasses.

In substituting the bow member or temple members 86 for the arms 94 pressure is exerted on the inwardly extending lip 40 on the side of the frame 10 in which the bow member or temple is located. This releases the pressure of the adjacent spring tongue 36 or 38 on the head 90 of the bow or temple member 86, thus freeing the pin extending therethrough for extraction. Upon extracting the pin from its position in the frame 10 the temple or bow member 86 may be moved in the L-shaped slot until the spherical head 90 aligns with the enlarged opening at the end of the horizontal leg of the L-shaped slot. When in this position the spherical head 90 may be withdrawn from the frame 10. In inserting the spherical head 100 of an arm 94 the operation just described is reversed. Thus it will be seen that exchange of the bow or temple members and the arms may be easily effected.

I claim:

In a visor support an elongated inverted channel shaped frame adapted to be supported above the eyes of a user on a pair of glasses worn by the user, parallel vertically disposed end walls closing opposite ends of the channel shaped frame, an elongated shade member, angularly extending ears carried by the shade member adjacent opposite ends thereof, means pivotally connecting the ears to the end walls for supporting the shade member on the frame for movement from a position above the eyes of the user to a position in front of the eyes of the user, bottom walls carried by the end walls and extending inwardly therefrom in substantially parallel relation to the frame, the frame having an opening extending therethrough adjacent each end wall, each bottom wall having an opening extending therethrough in alignment with the adjacent opening in the frame, elongated bow members, a spherical enlargement carried by each bow member adjacent one end thereof, said enlargements being adapted to enter the spaces between the channel shaped member and the bottom walls, each enlargement having an opening extending therethrough, pins extending through the aligned openings and through the enlargements, and transversely corrugated spring tongues carried by the bottom walls and extending therefrom toward the channel shaped member in spaced parallel relation to the pins for engaging the enlargements and holding the bow members in longitudinal adjusted position on the pins.

FRANCIS S. CREIGHTON.

REFERENCES CITED

The following references are of record in the file of this patent:

UNITED STATES PATENTS

| Number | Name | Date |
|---|---|---|
| 862,124 | Allan | Aug. 6, 1907 |
| 1,577,700 | Edwards | Mar. 23, 1926 |
| 1,650,236 | Rollins | Nov. 22, 1927 |
| 1,723,475 | Esleck | Aug. 6, 1929 |
| 1,876,225 | Hannan et al. | Sept. 6, 1932 |
| 2,192,208 | Stevens | Mar. 5, 1940 |
| 2,297,338 | Willson | Sept. 29, 1942 |
| 2,389,023 | Brown | Nov. 13, 1945 |
| 2,406,190 | Burdick | Aug. 20, 1946 |
| 2,447,936 | Ellis | Aug. 24, 1948 |
| 2,472,731 | Splaine | June 7, 1949 |
| 2,490,868 | Hansen | Dec. 13, 1949 |

FOREIGN PATENTS

| Number | Country | Date |
|---|---|---|
| 907,403 | France | June 25, 1945 |